No. 798,872. PATENTED SEPT. 5, 1905.
L. CARLSON.
FENDER.
APPLICATION FILED APR. 3, 1905.
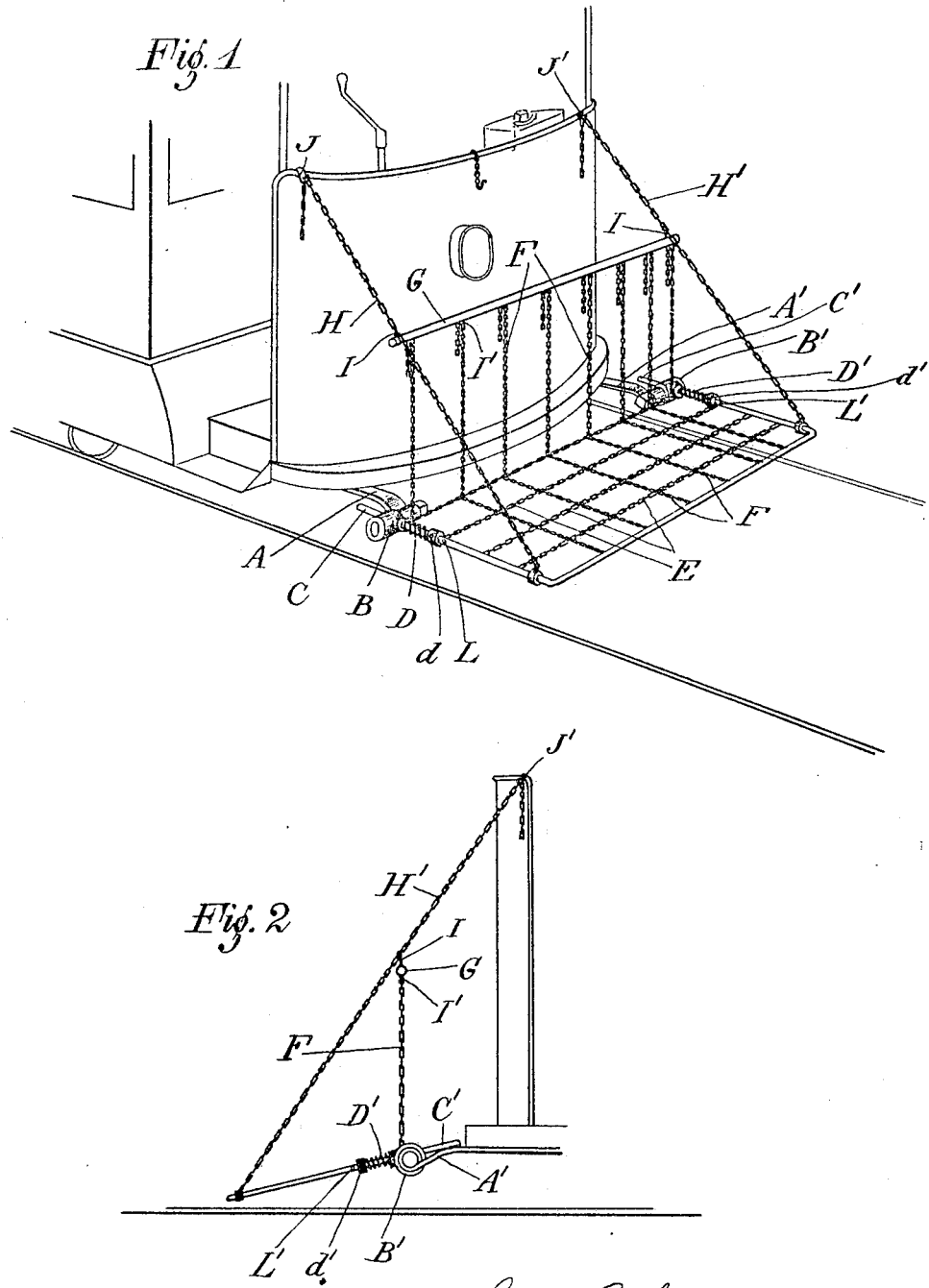

UNITED STATES PATENT OFFICE.

LOUIS CARLSON, OF BROOKLYN, NEW YORK.

FENDER.

No. 798,872.      Specification of Letters Patent.      Patented Sept. 5, 1905.

Application filed April 3, 1905. Serial No. 253,515.

*To all whom it may concern:*

Be it known that I, LOUIS CARLSON, a citizen of the United States of America, residing at Brooklyn, in the county of Kings and State of New York, have invented certain new and useful Improvements in Fenders, of which the following is a specification, reference being had therein to the accompanying drawings.

My invention relates to improvements in vehicle-fenders, and has particular reference to the class of fenders used for railway and street cars. One of the faults of fenders of this class is the tendency of the fenders to set too high from the ground. A person struck by a high fender is apt to be thrown forward instead of upon the fender, and the fender being high above the ground passes over the body instead of picking it up. By my invention the height and position of the fender may be adjusted, and the fender is preferably hung in a declined position, so that it will act as a scoop when it encounters any object. This insures the picking up of an object, so that it is carried along upon the fender until removed.

Referring to the accompanying drawings, Figure 1 is a perspective of a street-car, showing the application of my fender; and Fig. 2 is a side view.

A A' are supports attached to the car, which carry the couplings B B', adapted to receive the ends C C' of the tray of the fender.

D D' are springs retained in place by the pins $d$ $d'$ and are intended to cushion the striking effect of the fender.

The interior of the fender may be constructed of ropes, wires, chains, or any other suitable material; but for convenience of illustration the use of chains is described.

E represents the transverse chains connecting the opposite sides of the fender, and F represents the longitudinal chains connecting the back and front of the fender. The chains may be attached in any suitable manner, preferably by hooks or rings engaging the links thereof.

The bar G is preferably adjustable along the diagonal supporting-chains H H' and may be attached thereto by hooks, such as I, engaging the links thereof or by any other suitable means. The bar G may also be provided with hooks I' for engaging links of the chains F, and other hooks J J' may be secured to the car for engaging links of the supporting-chains H H'. By this arrangement it will be observed that the height of the front of the tray of the fender may be regulated by taking up or letting out the supporting-chains H H' at the hooks J J', and the height of the back of the fender may also be adjusted by adjusting the bar G along the supporting-chains. The tension of the springs D D' may also be adjusted by shifting the pins $d$ $d'$ into the holes L L'.

The frame of the fender is preferably made of tubing of the quality and size usually employed in the construction of fenders of the same class.

From the foregoing it will be seen that my fender may be attached to any size of car by a slight change in the adjustment of the parts. It will also be observed that upon encountering an object of resistance the tray of the fender will dip, as shown in Fig. 2, because of the declination given to the same in the hanging thereof, thereby insuring the picking up of the object.

I do not limit my invention to the exact arrangement or construction of parts shown or described, as modifications may be made without departing from the spirit of same.

What I claim, and desire to secure by Letters Patent, is—

In a fender, a framework connected by longitudinal and transverse members, the front of said fender adjustably supported by diagonal members from the front of the car, a transverse supporting member adjustably attached to said diagonal members, said longitudinal members connected to the front of the fender and adjustably attached to said transverse supporting member, said transverse members connecting the sides of the fender, and couplings provided with springs adapted to receive the ends of the tray of the fender and cushion the same.

In testimony whereof I affix my signature in presence of two witnesses.

LOUIS CARLSON.

Witnesses:
     THOMAS A. HILL,
     GEO. W. EISENBRAUN.